March 24, 1970　　　T. H. TERRY　　　3,502,176
AXLE MECHANISM WITH ADJOINING FILTER HOUSING
Filed Jan. 14, 1969　　　　　　　　　　3 Sheets-Sheet 1
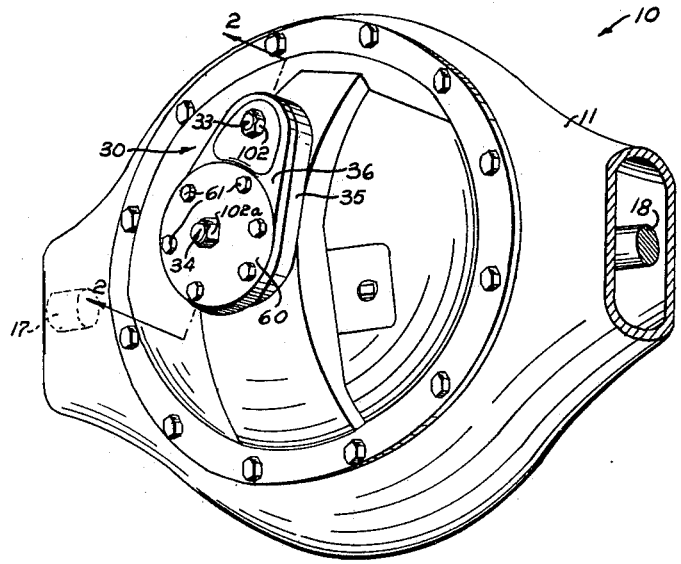
FIG.1
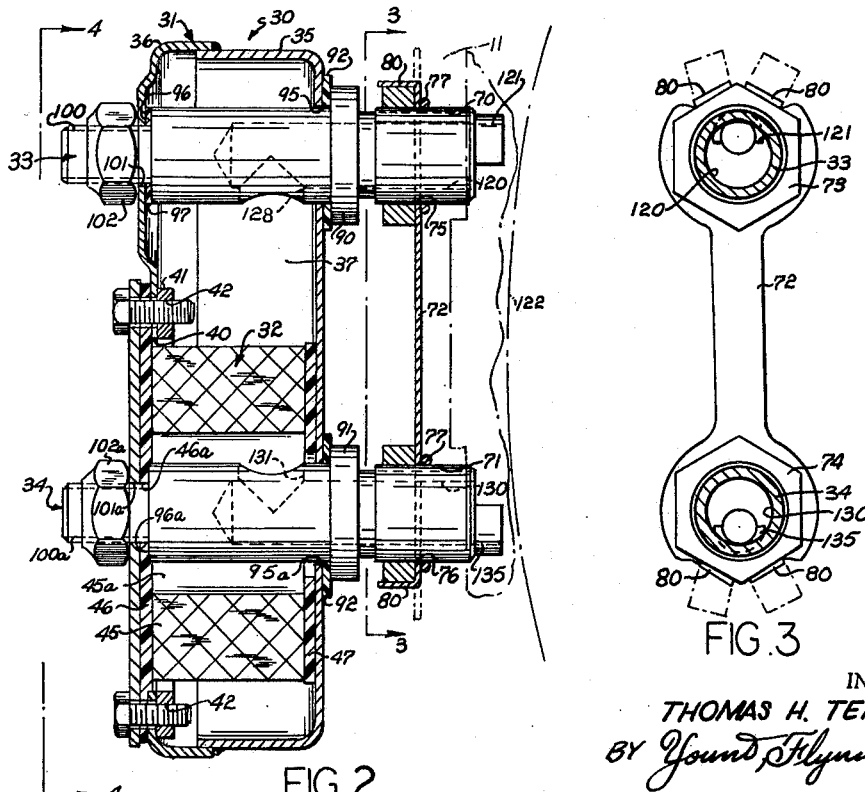
FIG.2
FIG.3
INVENTOR.
THOMAS H. TERRY
BY Young, Flynn & Tarolli
ATTORNEYS

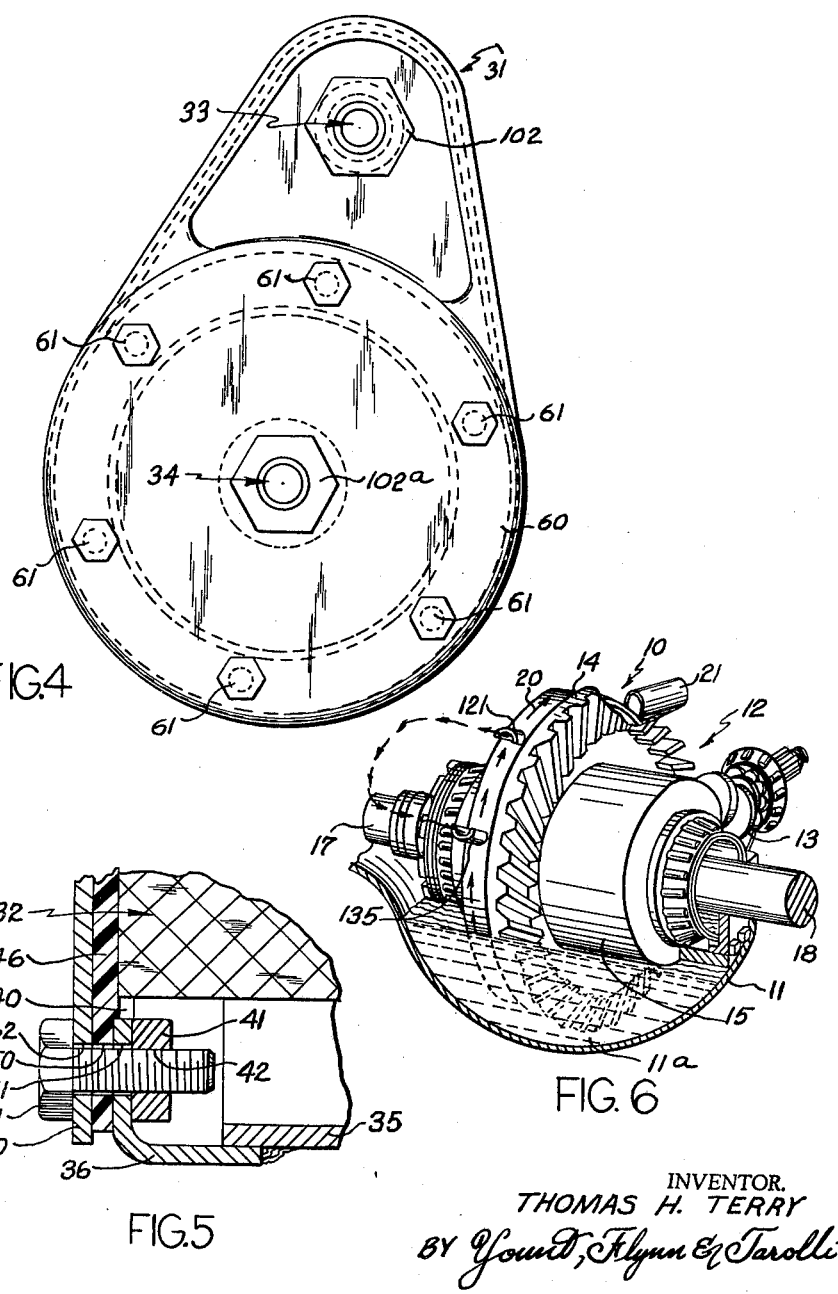

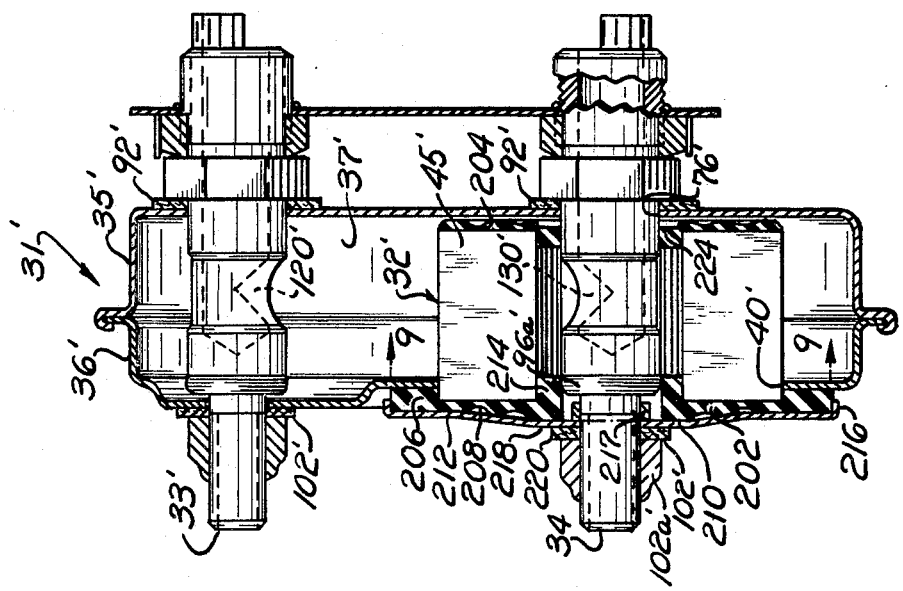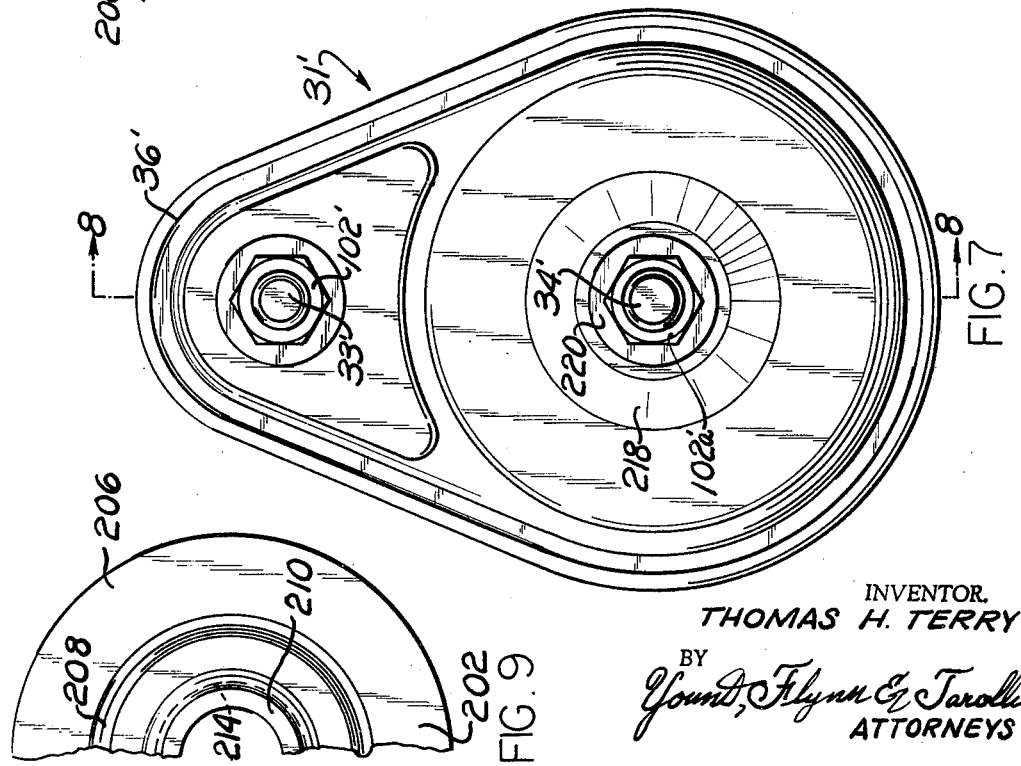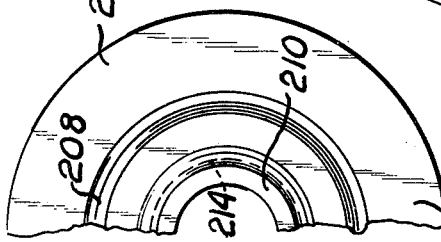

United States Patent Office 3,502,176
Patented Mar. 24, 1970

3,502,176
AXLE MECHANISM WITH ADJOINING FILTER HOUSING
Thomas H. Terry, deceased, late of Bay Village, Ohio, by Carol C. Terry, executrix, Bay Village, Ohio, assignor to Eaton Yale & Towne Inc., Cleveland, Ohio, a corporation of Ohio
Continuation-in-part of application Ser. No. 639,685, May 19, 1967. This application Jan. 14, 1969, Ser. No. 791,552
Int. Cl. F16n 7/16, 39/06
U.S. Cl. 184—6                              24 Claims

ABSTRACT OF THE DISCLOSURE

A ring gear of a differential gear mechanism in an axle housing rotates in a lubricant reservoir and conveys lubricant to a lubricant filtering unit which receives the lubricant filtering unit which receives the lubricant from the ring gear. The lubricant filtering unit includes a filter housing which supports an annular filter member through which the lubricant flows prior to flowing back into the housing chamber. The filter housing is secured to the axle housing by a pair of threaded support members, each of which have a lubricant passageway therein. One support member directs the lubricant from the axle housing to the filter member and the other support member directs the lubricant from the filter member back into the axle housing.

---

This application is a continuation-in-part application of copending United States application Ser. No. 639,685, filed May 19, 1967, and now abandoned.

The present invention relates to an axle mechanism, and particularly to an axle mechanism having a lubricant reservoir and a power transmitting gear movable through the reservoir to pick up lubricant and carry the lubricant to a location from which it is distributed to different parts of the axle.

The principal object of the present invention is the provision of a new and improved axle having a lubricant distribution system and a lubricant filter unit of simple and economical construction and which functions to remove dirt and particles from the lubricant.

An important object of the present invention is the provision of a new and improved axle mechanism having an axle housing defining a lubricant reservoir through which a power transmitting gears moves to pick up lubricant and carry the lubricant to a location for distribution to different parts of the axle and wherein a lubricant filtering unit carried by the axle is located to receive lubricant from the gear and functions to effect a filtering of the lubricant and after filtering directs the lubricant back into the axle housing.

A further object of the present invention is the provision of a new and improved axle having a lubricant distribution system which directs lubricant to various parts of the axle and a lubricant filter unit which is operable to filter the lubricant, and wherein the lubricant filter unit is secured to the axle housing by a pair of threaded support members which have lubricant directing passageways therein.

Another object of the present invention is the provision of a new and improved filter unit for use in filtering the lubricant in an axle mechanism and wherein the filter unit includes an easily replaceable filter member and the same threaded member positions in assembled relation the filter member and a cover adaptable to abut a sealing gasket located on the filter member.

Another object of the present invention is the provision of a new and improved filter unit for use in filtering the lubricant in an axle mechanism and which includes a filter member having a sealing gasket on the end thereof and a filter cover member is constructed so as to abut with the sealing gasket to position the filter unit and provide a highly efficient lubricant seal therebetween.

Further objects and advantages of the present invention will be apparent to those skilled in the art to which it relates from the following detailed description of a preferred embodiment of the present invention made with reference to the accompanying drawings forming a part of this specification and in which:

FIG. 1 is a perspective view of an axle mechanism embodying the present invention;

FIG. 2 is a sectional view of a filter unit associated with the axle of FIG. 1, and taken approximately along section line 2—2 of FIG. 1;

FIG. 3 is a sectional view taken approximately along section line 3—3 of FIG. 2;

FIG. 4 is an end elevational view of the mechanism shown in FIG. 2, looking at the mechanism of FIG. 2 as indicated by the arrows 4—4;

FIG. 5 is an enlarged fragmentary sectional view of a portion of the mechanism shown in FIG. 2;

FIG. 6 is a perspective, somewhat schematic view of the axle mechanism of FIG. 1;

FIG. 7 is an end elevational view of another embodiment of a filter unit for use with an axle mechanism;

FIG. 8 is a fragmentary sectional view of the filter mechanism of FIG. 7 taken approximately along section line 8—8 of FIG. 7; and FIG. 9 is a fragmentary end elevational view of the filter member used in the embodiment of FIG. 8 taken approximately along the lines 9—9 of FIG. 8.

The present invention provides an improved axle mechanism of the type which utilizes a power transmitting gear member which rotates in a lubricant reservoir for the distribution of lubricant to the various parts of the axle. The present invention provides a simple, yet reliable filtering mechanism for removing dirt and other particles from the lubricant. The filtering mechanism may be utilized with axles of different construction and, as representing the preferred embodiment of the present invention, the drawings illustrated a rear driving axle mechanism 10 for a vehicle.

The axle mechanism 10 includes an axle housing 11 having a gear chamber therein. A power transmitting gear unit, which is generally designated 12 and illustrated in FIG. 6, is located in the gear chamber. The power transmitting gear unit 12 is driven from the drive line of the vehicle in which the axle is utilized by a pinion gear 13 which meshes with a ring gear 14 of the gear unit 12. The ring gear 14 comprises the ring gear of a differential gear mechanism which is contained within the casing 15, and is not shown in the drawings. The differential gear mechanism transmits drive from the ring gear 14 to the axles 17, 18 which drive the opposite rear wheels of the vehicle. The power transmitting gear unit may be of any particular construction and any conventional or suitable gear unit may be utilized, and greater details of the power transmitting gear unit are not necessary to an understanding of the present invention.

The lower portion of the housing 11 defines a lubricant reservoir 11a which contains lubricant which is to be distributed to various parts of the axle mechanism during the operation of the axle. In order to effect the distribution of the lubricant through the axle, the ring gear 14 rotates through the lubricant reservoir 11a. The ring gear 14 includes an annular portion 20 which comprises a lubricant pickup means. The annular portion 20 rotates through the lubricant reservoir and picks up the lubricant and conveys it vertically upwardly, as illustrated by the arrows in FIG. 6. Other lubricant is picked up by the gear teeth of the ring gear 14 and is also conveyed upwardly thereby.

The lubricant which is picked up and conveyed by the annular portion 20 of the ring gear 14 is removed from the annular portion 20 by a receiver member 21. The receiver member 21 directs lubricant therefrom to various passageways, not shown, which effect distribution of the lubricant to various parts of the axle, as is well known. For a more detailed disclosure of the receiver and the lubricant distribution system, reference may be made to United States Patent No. 3,153,464.

The axle mechanism 10 includes a lubricant filter unit 30 which is supported on the housing 11 and is effective to filter lubricant which flows therethrough by removing dirt and other particles from the lubricant. The filter unit 30 includes a filter box assembly 31 which supports a filter member 32 and which is secured to the housing 11 by a pair of threaded stud or bolt like members 33, 34. The filter box assembly 31 includes a pair of dish-shaped members 35, 36 which are welded together so that the members 35, 36 define a filter chamber 37 therebetween in which the filter member 32 is located.

The member 36 has an opening 40 therein providing access to the filter chamber 37 for purposes of cleaning and removal of the filter member 32. A reinforcing ring member 41 is secured to the member 36 and projects into the filter chamber 37. The reinforcing ring 41 encircles the opening 40 and provides reinforcement around the opening 40. The reinforcing ring 41 has a plurality of tapped holes 42 at equally spaced locations therearound.

The filter member 32 comprises a filter portion 45 which is located in the filter chamber 37 and opposite support ends or flanges 46, 47. The filter portion is ring-like in shape and is annular with an opening 45a extending axially therethrough. The support flanges 46, 47 are secured to the opposite axial ends of the ring-like filter portion 45. The support flange 46 projects so as to overlap an outer surface portion of the member 36. The flange 46 has a plurality of openings 50 therein which align with openings 51 in the member 36 and which openings, in turn, align with the threaded openings 42 in the reinforcing ring 41.

A circular cover member 60 for the opening 40 in the member 36 is secured in position by suitable cap screws 61 which project through openings 62 in the cover member and through the openings 50, 51 in the flange 46 of the filter member 32 and member 36, respectively. The screws 61 are threaded into the tapped holes 42 in the reinforcing ring and when tightened provide a clamping pressure holding the cover 60 in position, as well as the filter member 32 in the filter chamber 37. The flange portion 47 of the filter member is held in engagement with the inner surface of the member 35.

As best seen in FIG. 4, there are six screws 61 which are positioned at equally spaced circumferential locations around the opening 40 and around the filter member 32. It should be apparent that the filter member may be removed and replaced by removing the screws 61 and the cover 60 from the member 36. This provides access into the filter chamber 37 and permits removal of the filter member 32 from the filter chamber 37 and the positioning of a new filter member in the filter chamber. The screws 61 can then be repositioned and tightened so as to secure the new filter member in position in the chamber 37.

The stud members 33, 34 which secure the filter unit 30 to the housing 11 are vertically spaced, with the stud member 33 being located above the stud member 34. The stud members 33, 34 are threaded into tapped openings 70, 71, respectively, in the housing 11. The stud members 33, 34 are locked in position by a locking strap member 72 which cooperates with nuts 73, 74 33, 34, respectively. The stud members 33, 34 extend through openings 75, 76, respectively, in the strap member 72 and the nuts 73, 74 clamp the strap member 72 against the housing 11. Suitable gaskets 77 are located in position between the strap 72 and the housing 11. The strap member 72 has a pair of tabs 80 at each ends thereof. The tabs 80 project outwardly as shown in dotted lines in FIG. 3 and are bent down into the full line position, as shown in FIG. 3, to engage flats on the nuts 73, 74, respectively. By engagement of the tabs with the flats on the nuts, rotation of the nuts 73, 74 is prevented, which, in turn, blocks rotation of the stud members 33, 34, respectively, in the threaded openings in the housing 11. This assists in preventing the studs from loosening from vibration during the operation of the vehicle.

The stud members 33, 34, respectively, have annular shoulder portions 90, 91 which are in clamping engagement with the side of the member 35 which faces the axle housing. Suitable gaskets 92 are located between the shoulders 90, 91 and the rear side of the member 35.

The stud member 33 projects through an opening 95 in the member 35 and has a neck-down portion which provides a shoulder 96 which clampingly engages the inner surface of the member 36. A gasket 97 is located between the shoulder 96 and the inner surface of the member 36. The forward end 100 of the stud member 33 is threaded and projects through an opening 101 in the member 36. A lock nut 102 is threaded onto the portion 10 of the stud member 33 and is threaded into tight clamping engagement with the outer surface of the member 36, thereby tightly clamping the filter housing assembly 30 onto the stud member 33 with the gaskets 92, 97 providing for a tight fluid seal therebetween.

The stud member 34 is constructed similarly to the stud member 33. The stud member 34 projects through a lower opening 95a in the member 35 and through an opening 101a in the cover member 60. A neck-down portion 100a of the stud member 34 also projects through an opening 46a in the filter member flange 46. A nut 102a is threaded onto the neck-down portion 100a of the stud member 34 and clamps the assembly 30 securely to the stud member 34. The flange portion 46 of the filter member 32 is sufficiently resilient to provide a fluid-tight seal between itself and the shoulder 96a of the stud 34.

The stud member 33 has a drilled passageway 120 axially extending therethrough which functions as a lubricant receiving passageway which receives lubricant from the gear chamber of the housing 11 and directs that lubricant into the filter chamber 37 of the filter unit. The end of the stud member 33 which is threaded into the opening 70 in the housing 11 has a projecting hood portion 121 which projects into the chamber. The hood portion 121 is of a U-shape, as best seen in FIG. 3, and projects adjacent the rotating gear 14 and specifically adjacent the rotating teeth of the gear 14. The line designated 122 in FIG. 2 indicates generally the path of movement of the ring gear 14 and shows generally the relative position between the hood member 121 and the path of movement of the ring gear adjacent thereto. Lubricant which is carried by the ring gear 14 is splashed or thrown against the underside of the hood 121 and directed into the passageway 120. This fluid flows axially along the passageway 120 and is directed into the filter chamber 37 through the radial passage 128 which communicates with the passageway 120 and with the filter chamber 37. The lubricant then flows by gravity downwardly through the annular filter portion 45.

The stud member 34 also has a passageway therethrough which is designated 130. The passageway 130 communicates with the filter chamber 37 through a radially extending passageway or opening 131. The lubricant which flows through the filter 45 flows through the opening 131 and then axially of the stud member 34 through passageway 130. The passageway 130 opens into the gear chamber and the lubricant, after being filtered, flows back into the gear chamber. The end of the stud member 34 has a projecting U-shaped hood portion 135 which projects into the gear chamber and which assists in directing the fluid back into the chamber. The fluid which is directed back into the chamber flows into the chamber adjacent the annular portion 20 of the gear 14, in view of the fact that the openings in the housing 70, 71 are somewhat staggered with respect to the vertical and do not lie on a vertical line, as best seen in FIG. 6.

From the above, the operation and function of the filter unit should be clear. It should be apparent that as the gear 14 rotates through the lubricant reservoir, lubricant is picked up by the gear portion 20 and by the gear teeth of the gear 14 and is slung, splashed, or otherwise conveyed into the passageway 120 in the stud member 33. This lubricant flows through the filter member 45 and is filtered thereby and the filtered lubricant then flows through the passageway 130 back into the gear chamber. Any dirt or impurities which are filtered from the lubricant may fall into the lower portion of the filter housing 31 and may be removed therefrom upon replacement of the filter member.

A modified filter unit 200 for use with an axle is illustrated in FIGS. 7-9. Since may the components of the filter unit 200 of FIGS. 7-9 are similar to components of the filter unit of FIGS. 1-6, corresponding reference numerals with primes attached thereto will be used to indicate these similar components.

The filter unit 200 includes a filter box assembly 31' which supports a filter member 32' and which is secured to the axle housing by a pair of threaded studs or bolt like members 33', 34'. The filter box assembly includes a pair of dish-shaped members 35', 36' which are welded together to define a filter chamber 37' therebetween and in which the filter member 32' is located.

The filter member 32' comprises a cylindrically annular shaped filter portion 45'. Attached to the opposite ends of the filter portion 45' are circular rubber gasket members 202 and 204, respectively. The filter portion 45' and the gasket members 202, 204 form a unitary filter member and have concentric axial cylindrical passageways therethrough. The bolt 34' extends through the cylindrical passageways to locate the filter portion 45' and the gasket members 202, 204 with respect to the filter box assembly.

The rubber gasket 202 has an annular flange portion 206 which projects radially beyond the filter portion 45', and is interposed between a cover member 212 and the outer surface of the dish-shaped member 36' when the filter member 32' is located in the filter chamber 37'. When the cover member 212 is tightened the annular flange portion 206 is tightly engaged between the cover member 212 and the outer surface of the dish-shaped member 36' to provide a lubricant seal and prevent lubricant leakage therebetween. The gasket 202 further includes a sleeve portion 214 defining the axial passageway therethrough and projecting into the axial passageway of the filter portion 45'. The sleeve portion 214 engages a portion 96a' of the bolt 34' to effect a seal to prevent leakage of lubricant therebetween from the chamber 37'.

The circular cover member 212 for the opening 40' in the member 36' is positioned by the single bolt 34' which passes through the cover member 212, the dish-shaped member 35', and the cylindrical passageways in the filter portion 45' and the gasket members 202, 204. The cover member 212 includes a rim portion 216, a sleeve 217 and a raised annular central portion 218. The cover 212 is positioned in overlying relation with the gasket member 202 and engages therewith. A lock nut 102a' is located on bolt 34' and engages a gasket 220 which in turn engages the cover member 212. Tightening of the lock nut 102a' positions the cover member 212 over the opening 40' to in turn position the filter portion 45' and the gasket members 202, 204 in the filter chamber 37'.

An annular groove 208 is formed in the surface of the gasket 202 which engages the cover 212. The annular groove 208 of the gasket member 202 provides extra sharp line surfaces which when pressed against the cover 212 provide seal areas in the nature of a squeegee action, when the lock nut 102a' is tightened and the cover 212 is pressed against the gasket member 202. The gasket 202 also includes a raised annular ridge 210 located centrally thereof, and the portion 218 of the cover member 212 engages the annular ridge 210 when the lock nut 102a' is tightened about the bolt 34' to effect a lubricant seal therebetween. Thus, the cover member 212, the gasket 202 and the bolt 34' are operably engageable to provide effective lubricant seals to prevent the flow of lubricant from the filter chamber 37' through the opening 40'.

The gasket member 204 is spaced from the member 35' to provide that the tolerances will not stack up to produce a sprung cover member 212. The gasket member 204 includes a central axial sleeve portion 224. The sleeve portion 224 is positioned in the opening through the filter portion 45' and through which the bolt 34' passes. The sleeve portion 224 engages with the bolt 34' to effect a lubricant seal therebetween. Moreover, annular gaskets 92' and 102' are provided on both ends of the bolts 33' and 34' as illustrated in FIG. 8 to further prevent lubricant leakage from the filter chamber 37'.

The bolt members 33', 34' which secure the filter unit 200 to the axle have passageways 120', 130' respectively extending therethrough. The passageway 120' functions to receive lubricant from the axle mechanism which is then directed into the filter chamber 37'. The lubricant is then passed through the filter 45' and out the passageway 130' to the axle of the vehicle.

From the above, the function of the filter unit 200 should be clear. Lubricant enters the filter unit 200 through the passageway 120' and is filtered by the filter unit 45'. After the lubricant is filtered it flows back to the axle mechanism through the passageway 130'. Thus, the filter unit 200 functions in essentially the same manner as the filter unit 30 hereinabove described. Moreover, the modifications of the filter unit 200 provide for improved provision for sealing the lubricant within the filter chamber 37'. Furthermore, the provision of a single bolt 34' to position both the filter 32' and the cover 212 decreases production costs and the time needed for replacing the filter member 32'.

Having described my invention, I claim:

1. An axle mechanism comprising an axle housing containing a gear chamber and defining a lubricant reservoir in the lower portion of said chamber, a power transmitting gear unit rotatable in said chamber, said power transmitting gear unit having an annular portion movable through said reservoir as a lubricant pick-up means for picking up lubricant and conveying it to a discharge location from where it is distributed through the axle, and a lubricant filter unit supported by said housing, said filter unit including means defining a lubricant receiving passageway opening adjacent the periphery of said annular portion, means for engaging lubricant moving under the influence of said annular portion to direct lubricant to flow into said passageway, said annular portion imparting sufficient velocity to the lubricant to cause the lubricant to flow into said passageway and through said filter unit, means defining a lubricant return passageway opening into said gear chamber to return filtered lubricant to said gear chamber, a filter housing defining a lubricant filtering chamber in fluid communication with said lubricant receiving and return passageways, and a lubricant filter member supported in said filtering chamber and effective to filter lubricant which flows therethrough.

2. An axle mechanism as defined in claim 1 wherein said means defining said lubricant receiving passageway comprises a first threaded support member threaded into said axle housing and said means defining said lubricant return passageway comprises a second threaded support member threaded into said axle housing.

3. An axle mechanism as defined in claim 2 wherein said means for engaging lubricant include U-shaped hood projections extending into said axle housing from the ends of said threaded support members.

4. An axle mechanism as defined in claim 2 wherein said threaded support members extend through said filter housing and each of said threaded support members has a shoulder portion in clamping engagement with one side of the housing and a nut member is threaded onto a portion of the threaded support member and is in clamping engagement with the opposite side of the housing.

5. An axle mechanism as defined in claim 2 wherein said filter member comprises an annular ring-like member having a central opening therethrough and one of said threaded support members extends through said central opening.

6. A lubricant filter unit as defined in claim 1 wherein said lubricant filter member has opposite yieldable gasket means thereon, said gasket means and said filter member having aligned openings therein, and further including means for securing said filter unit to said axle mechanism including a first support member passing through said aligned openings.

7. A lubricant filter unit as defined in claim 6 further including a cover member engaging one of said gasket means, said one gasket means including an annular groove located thereon, said annular groove providing ertra sharp seal lines to prevent leakage of lubricant from said filter chamber when said gasket means is disposed in a pressed relationship against said cover member.

8. A lubricant filter unit as defined in claim 7 wherein said cover member and said one gasket means has an annular ridge portion, said annular ridge on said cover member being sealingly engaged with said annular ridge on said gasket to form a fluid seal therebetween to prevent leakage of lubricant from said filter chamber.

9. A lubricant filter unit as defined in claim 8 wherein said yieldable gasket means further include sleeve portions engaging with said first support member to provide a seal therebetween to prevent leakage of lubricant from said filter chamber.

10. An axle mechanism as defined in claim 1 further including yieldable gasket means disposed on the end of said filter member, said yieldable gasket means being in a sealing relationship with said housing to prevent the flow of lubricant from said filter unit.

11. In an axle having an axle housing defining a gear chamber therein with a lubricant reservoir in the lower portion of said gear chamber and a lubricant distribution system for directing lubricant to various parts of said axle, a lubricant filter unit including a filter unit housing defining a filter chamber, a lubricant filter member supported in said filter chamber, means for securing said filter unit housing to said axle housing including at least a pair of vertically spaced support members, the upper one of said support members having a passageway therethrough communicating at one end with said gear chamber to receive lubricant therefrom and communicating at the other end with said filter chamber, the lower one of said support members having a passageway communicating at one end with said filter chamber at a location below at least a portion of said filter member and communicating at its other end with said gear chamber to direct filtered lubricant from said filter unit into said gear chamber, and wherein the flow of lubricant through said filter unit is in a downwardly direction under the influence of gravity flowing first through said upper support member, secondly through said filter member and thirdly through said lower support member to the lubricant reservoir.

12. In an axle as defined in claim 11 wherein each of said support members is threaded into an opening in said axle housing and further including means for preventing rotation of said threaded support members in said threaded openings.

13. In an axle as defined in claim 11 wherein support members extend through said filter unit housing and have portions thereon in fluid-tight clamping engagement with opposite portions of said filter unit housing.

14. In an axle having an axle housing defining a gear chamber therein with a lubricant reservoir in the lower portion of said gear chamber and a lubricant distribution system for directing lubricant to various parts of said axle, a lubricant filter unit including a filter unit housing defining a filter chamber, an annular lubricant filter member supported in said filter chamber, means securing said filter member in said filter chamber and providing for removal of said filter member from said filter chamber, and a pair of support members connected with said axle housing and extending through said filter unit housing and each supporting said housing at spaced locations, said pair of support members defining a lubricant receiving passageway for directing lubricant to said filter chamber and a lubricant return passageway for directing lubricating from said filter chamber to said lubricant reservoir, one of said support members extending through a central opening in said annular filter member whereby said annular filter member encircles said support member.

15. In an axle as defined in claim 14 wherein said support members are threaded into said axle housing and further including means for preventing rotation of said support members to prevent loosening of said filter unit housing from said axle housing.

16. In an axle as defined in claim 14 wherein said filter unit housing includes a member having an opening providing for access to said filter chamber and a cover member covering said opening and removable for replacement of said filter member.

17. In an axle having an axle housing defining a gear chamber therein with a lubricant reservoir in the lower position of said gear chamber and a lubricant distribution system for directing lubricant to various parts of said axle, a lubricant filter unit including a filter unit housing defining a filter chamber, an annular lubricant filter member supported in said filter chamber, means securing said filter member in said filter chamber and providing for removal of said filter member from said filter chamber, and a pair of support members connected with said axle housing and extending through said filter unit housing, said pair of support members defining a lubricant receiving passageway for directing lubricant to said filter chamber and a lubricant return passageway for directing lubricant from said filter chamber to said lubricant reservoir, said support member being threaded into said axle housing and further including means for preventing rotation of said support members to prevent loosening of said filter unit housing from said axle housing, said means comprising a pair of nut members, one of said nut members threaded onto each of said threaded support members and a strap member extending between said nut members and having portions engaging flats on said nut members to prevent rotation of said nut members and wherein one of said support members extends through a central opening in said annular filter member whereby said annular filter member encircles said support member.

18. In an axle having an axle housing defining a gear chamber therein with a lubricant reservoir in the lower portion of said gear chamber and a lubricant distribution system for directing lubricant to various parts of said axle, a lubricant filter unit including a filter unit housing defining a filter chamber, an annular lubricant filter member supported in said filter chamber, means securing said filter member in said filter chamber and providing for removal of said filter member from said filter chamber, said filter unit housing includes a member having an opening providing for access to said filter chamber and a cover member covering said opening and removable for replacement of said filter member, a reinforcing ring member secured to said filter unit housing extending around said opening, said cover member and filter member being secured in position by threaded fasteners located in openings in said cover member, a flange portion of said filter member and said reinforcing, and a pair of support members connected with said axle housing and extending through said filter unit housing, said pair of support members defining a lubricant receiving passageway for directing lubricant to said filter chamber and a lubricant return passageway for directing lubricant from said filter chamber to said lubricant reservoir, and wherein one of said support members extends through a central opening in said annular filter member whereby said annular filter member encircles said support member.

19. In an axle having an axle housing defining a gear chamber therein with a lubricant reservoir in the lower portion of the gear chamber and a lubricant distribution system for directing lubricant to various parts of the axle, a lubricant filter unit including a filter unit housing defining a filter chamber, a lubricant filter member supported in said filter chamber, said housing having an opening communicating with said chamber for providing access to said filter member, a covering member for closing said opening and preventing the flow of lubricant from said filter chamber through said opening, a first support member extending through said cover member, and said housing to support said filter member in said filter chamber, said filter member having yieldable gasket means disposed on an end portion thereof, said yieldable gasket means having a larger diameter than the diameter of said opening which enables said gasket means to cover the periphery of said opening when said filter is located in said filter chamber, and provide a sealing relationship between said cover member and the housing when said cover member closes said opening to prevent the flow of lubricant between said cover member and said housing.

20. In an axle as defined in claim 19, wherein said yieldable gasket means includes an annular groove therein, said annular groove providing sharp sealing lines to prevent leakage of lubricant from said filter chamber when said gasket member is disposed tightly against said cover member and said housing.

21. In an axle as defined in claim 19, wherein said cover member has an annular ridge thereon, said annular ridge on said cover member being operatively associated with an annular ridge on said gasket means to form a fluid seal therebetween to prevent leakage of lubricant from said filter chamber.

22. In an axle as defined in claim 19 further including a second yieldable gasket means disposed on another end portion of said filter member, and wherein said second gasket member is disposed in a sealing relationship between said first support member, said housing, and said filter member to prevent the flow of lubricant from said filter chamber at the portion of said housing where said first support member extends therethrough.

23. In an axle as defined in claim 19 wherein said yieldable gasket means has a dish like configuration with a centrally located opening therein and wherein the radius of the centrally located opening is less than one-half of the radius of the dish.

24. In an axle as defined in claim 22, wherein said filter member and said yieldable gaskets include a cylindrical passageway therethrough and through which said support member extends, said yieldable gaskets further including sleeve portions located in said cylindrical passageway and engaging with said support member to provide a seal therebetween to prevent leakage of lubricant from said filter chamber.

References Cited
UNITED STATES PATENTS

| | | | |
|---|---|---|---|
| 2,381,141 | 8/1945 | Russell | 210—440 |
| 2,897,966 | 8/1959 | Humbert | 210—168 |
| 3,066,803 | 12/1962 | Seils | 210—168 |
| 3,153,464 | 10/1964 | Nelson et al. | 184—6 |
| 3,204,771 | 9/1965 | Baldwin | 210—440 XR |

FOREIGN PATENTS 770,502  3/1957  Great Britain.

FRED C. MATTERN, Jr., Primary Examiner

MANUAL A. ANTONAKAS, Assistant Examiner

U.S. Cl. X.R.

74—467; 184—11; 210—168

PO-1050
(5/69)

UNITED STATES PATENT OFFICE
CERTIFICATE OF CORRECTION

Patent No. 3,502,176          Dated March 24, 1970

Inventor(s) Thomas H. Terry

It is certified that error appears in the above-identified patent and that said Letters Patent are hereby corrected as shown below:

Column 9, line 2, after "forcing" insert --ring--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents